United States Patent [19]

Stillions

[11] 3,918,241

[45] Nov. 11, 1975

[54] CUTTING UNIT FOR ROTARY LAWN MOWERS

[76] Inventor: Herbert C. Stillions, Box 114, Rome, Miss. 38768

[22] Filed: Oct. 16, 1974

[21] Appl. No.: 515,404

[52] U.S. Cl. .................................. 56/12.7; 56/295
[51] Int. Cl.² ........................................ A01D 55/18
[58] Field of Search ............................ 56/295, 12.7

[56] References Cited
UNITED STATES PATENTS

| 3,184,907 | 5/1965 | Harloff................................. 56/295 |
| 3,247,656 | 4/1966 | Phelps.................................. 56/295 |
| 3,564,824 | 2/1971 | Tygh, Jr............................... 56/295 |
| 3,662,529 | 5/1972 | Glunk et al. ......................... 56/295 |

FOREIGN PATENTS OR APPLICATIONS

| 1,519,808 | 2/1968 | France................................. 56/295 |

Primary Examiner—J. N. Eskovitz

[57] ABSTRACT

A cutting unit for a rotary lawn mower is disclosed which includes a central mounting disc which is universally adapted to be attached to the drive shaft of various makes of rotary lawn mowers, either as a replacement unit, or as original equipment, and one or more sets of two blade units each, pivotally supported about the peripheral edge of the mounting disc in balanced opposition. The blade units each include a straight cutter blade portion having inner and outer ends, and an offset strap portion secured to the blade portion intermediate the ends thereof and extending in overlying relation to the inner end of the blade portion. Aligned holes in the overlying ends of the strap portion and the blade portion receive a headed pivot pin which also extends through a hole in the edge of the mounting disc to pivotally support the blade unit on the mounting disc. A cotter pin, or other quickly removable fastener is used to lock the pivot pin in position so that each blade unit may be quickly removed from the mounting disc for sharpening or the like.

10 Claims, 11 Drawing Figures

CUTTING UNIT FOR ROTARY LAWN MOWERS

BACKGROUND OF THE INVENTION

1. Field of the Invention

This invention relates to an improved cutting unit for a rotary type lawn mower and particularly to a cutting unit having a central mounting plate and plural blade units pivotally attached to the mounting plate in one or more sets of two for proper balancing.

2. Description of the Prior Art

Rotary lawn mowers having rotary blades with pivoted cutter tips are broadly old as disclosed by the following representative U.S. Pat. Nos.:

2,859,582
3,152,432
3,247,656
3,320,733
3,540,198

It is also broadly old to provide rotary blades with various means purportedly for adapting the blades to several makes and/or sizes of lawn mowers as is suggested by the following U.S. Pat. Nos.:

3,392,515
3,430,461
3,563,015
3,564,824

The present invention distinguishes from the devices disclosed by the above patents in ways which will become apparent as this description progresses.

SUMMARY OF THE INVENTION

This invention pertains to an improved cutting unit for a lawn mower. It may be utilized to replace existing cutting units or it may be provided as original equipment.

The object of this invention is the provision of a lawn mower cutting blade unit or kit which may be utilized as a replacement component for existing lawn mowers, or as original equipment for newly manufactured devices.

A further object of this invention is the provision of a replacement unit having means to adapt it to existing mowers having a drive shaft and a flanged plate.

A further object of this invention is to provide a lawn mower cutting blade unit sub-assembly having centrifugally mounted cutter blades wherein the stresses generated by the centrifugal force are transmitted in a direction substantially perpendicular to a longitudinal extent of the blade elements and received by generally vertically disposed pins.

A further object of this invention is the provision of a centrifugally mounted lawn mower cutting blade element having means to retain it upon its mounting plate whereby to guard it against release in the event that its locking means should accidentally be released.

BRIEF DESCRIPTION OF THE DRAWINGS

For a clearer understanding of this invention, the following detailed description is given.

DESCRIPTION OF THE PREFERRED EMBODIMENTS

Figure 1:
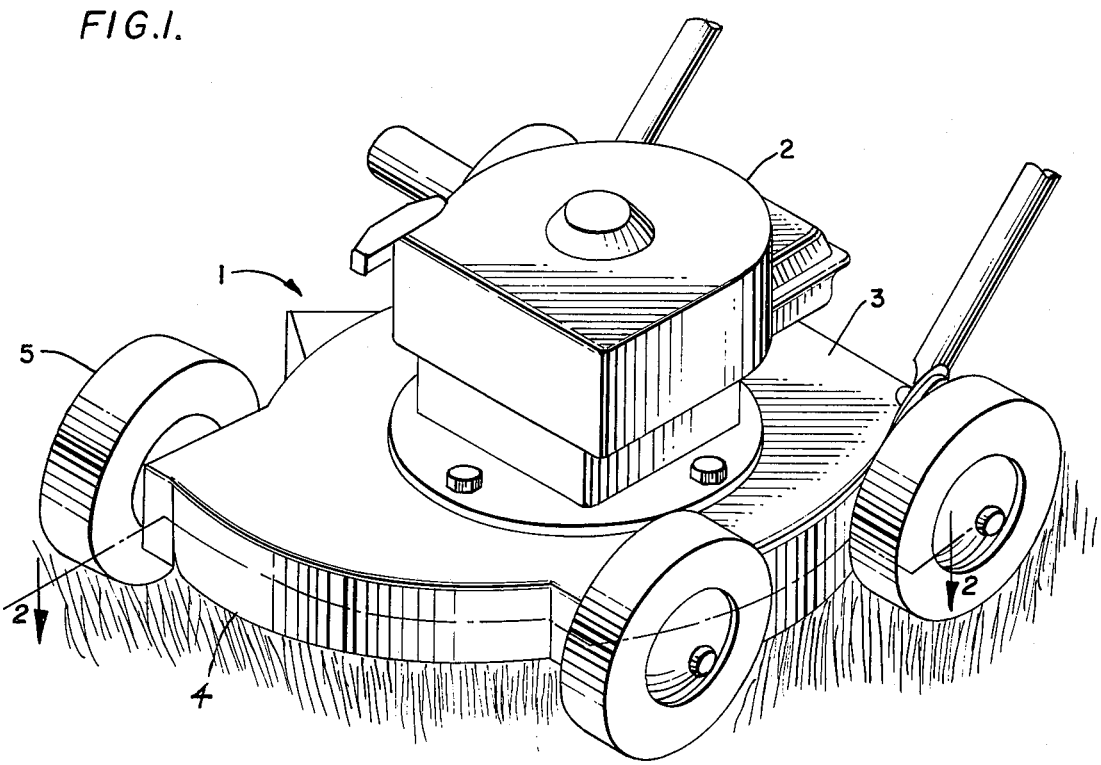
FIG. 1 is a perspective view of a conventional hand propelled lawn mower, wherein this invention may be incorporated.

The grass cutting device comprises a lawn mower 1 having a conventional source of power 2, cutter blade housing 3, depending skirt 4 and ground supporting wheels 5. While the device has been illustrated as hand propelled, it is obvious that this invention may be incorporated in a riding type mower having appropriate belt and pulley transmission means to the driven shaft.

Figure 2:
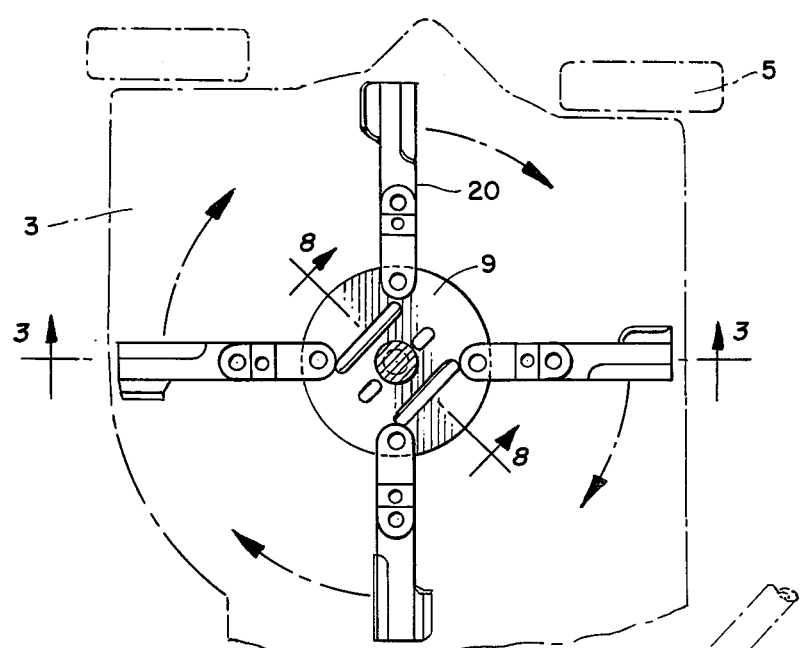
FIG. 2 is a sectional view taken along line 2—2 of FIG. 1.
Figure 3:
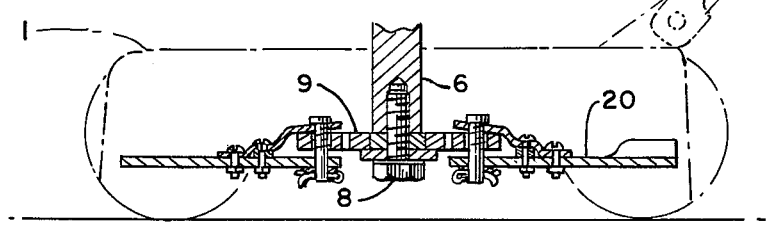
FIG. 3 is a sectional view taken along line 3—3 of FIG. 2.
Figure 4:
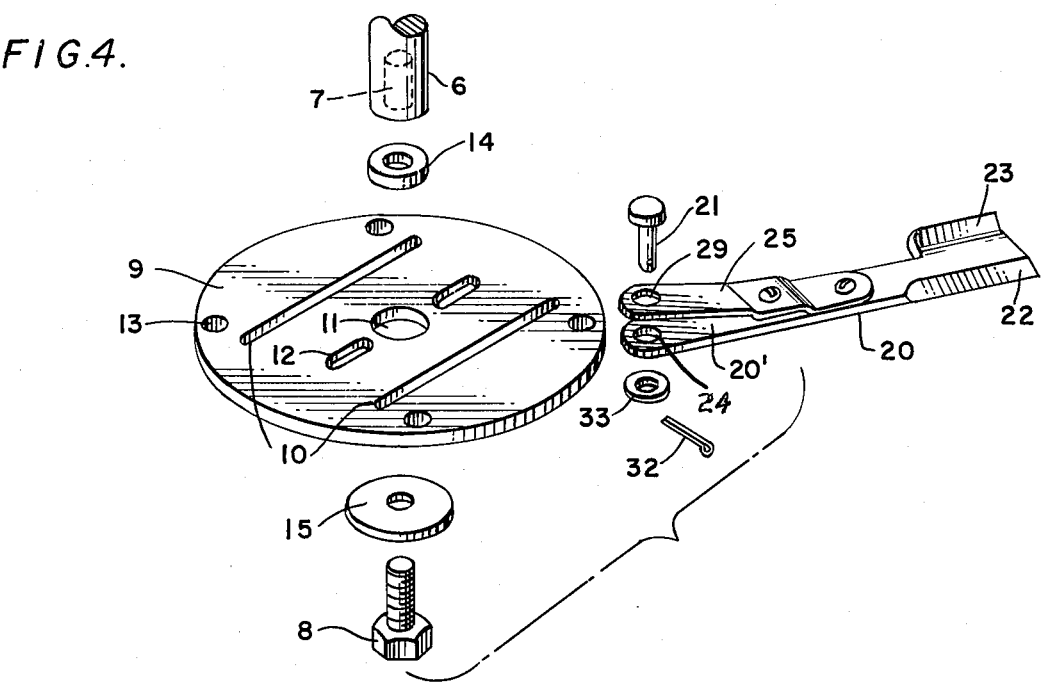
FIG. 4 is an exploded view of the lawn cutting blade replacement unit of this invention for use with various conventional power means.

The end of the driven shaft 6, which is driven in the direction of the arrows in FIG. 2, is internally threaded at 7 to accommodate a center bolt 8. A mounting disc 9, shown in FIG. 4, is provided with a pair of substantially parallel slots are uniformly disposed, one to each side of a center hole 11 in the disc. 9. The diameter of the disc may be varied to provide different widths of cut. The disc, in rotation, acts as a flywheel to develop the cutting torque.

The disc is further provided with a pair of slots 12 which are relatively shorter and wider than the slots 10 and are radially and diametrically aligned relative to the center hole 11. These slots are long enough and wide enough to accommodate the components of existing devices, as amplified below.

Inwardly spaced from the outer periphery of the disc 9 are a plurality of cutter blade element mounting apertures 13. While there have been illustrated herein four such apertures, it is obvious that more or less may be utilized depending as desired. The only requirement is that when the cutting blade elements are mounted thereon, they be dynamically in balance.

A spacer 14 of an outside diameter slightly less than the diameter of the center hole 11 is assembled in the center hole. The spacer is provided with a bore to permit passage of the bolt 8 therethrough. The spacer is of a thickness slightly less than that of the disc 9. An outer washer 15, of a diameter greater than the center hole, is mounted on the bolt 8 prior to assembly.

Figure 5:
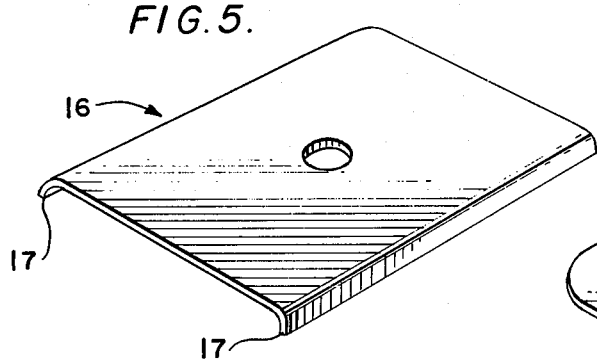
FIG. 5 is a flange plate which is operatively associated with this invention as is stated in detail below.
Figure 8:
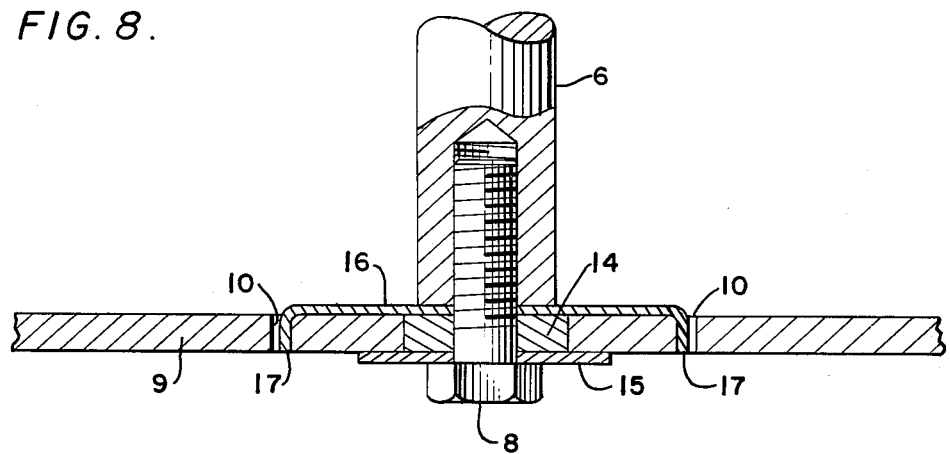
FIG. 8 is an illustration of the flange plate relation to the mounting disc and taken on line 8—8 of FIG. 2.

It has been found that the shaft 6 of some of the prior art mowers is provided with a flanged plate such as is shown at 16 in FIG. 5. The replacement blade unit is well adapted for use with such arrangement since it is merely necessary to dispose the flanges 17 in the slots 10. Upon tightening the bolt 8, the several component parts will be firmly and operatively interrelated as is shown in FIG. 8.

Figure 5A:
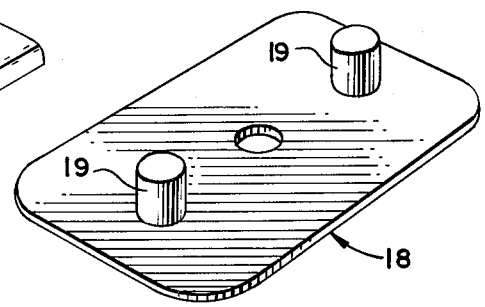
FIG. 5A illustrates a plate having studs, which may be utilized instead of the flauge plate of FIG. 5.

Alternatively, the shafts of some mowers are provided with a steel studded plate as at 18 in FIG. 5A.

Figure 9:
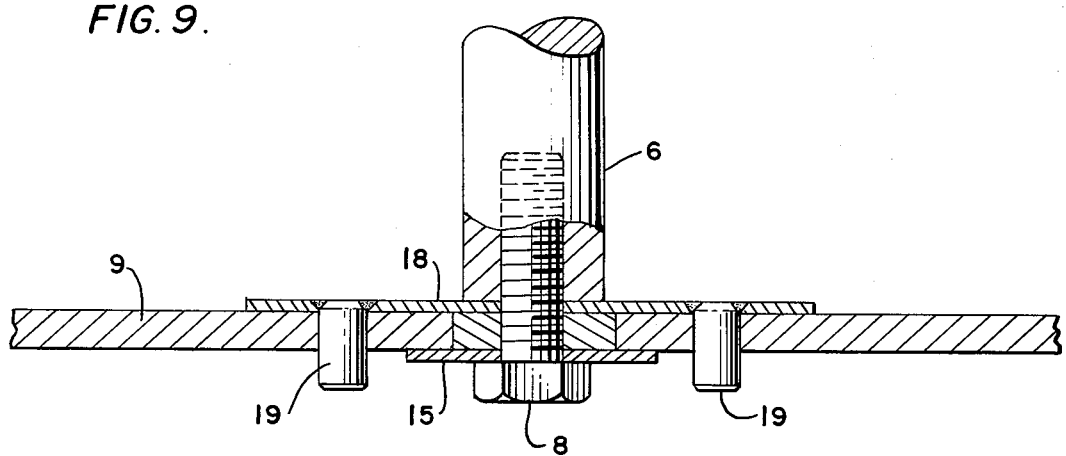
FIG. 9 is a view similar to FIG. 8, but showing the relation of the studded plate to the mounting disc.

The studs 19 thereof, in assembly, are disposed in the slots 12 and assembled as above-stated and as is shown in FIG. 9.

It should be noted that the sizes and specific positioning of the several slots may be varied to accommodate the characteristics of the individual mower.

Figure 10:
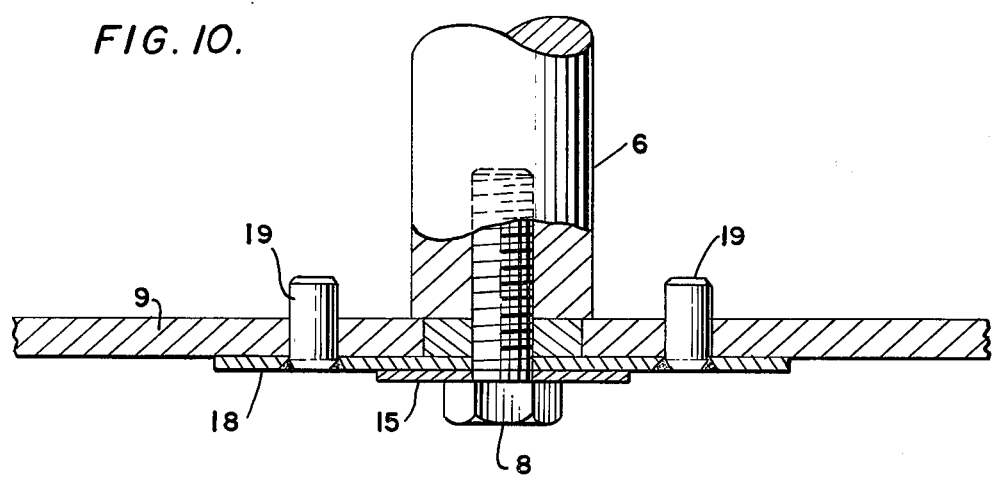
FIG. 10 shows an alternative relation of the studded plate to the mounting disc.

It has been found that the studded plate 18 may also be inverted and mounted beneath the disc 9 and be equally as effective. For this arrangement see FIG. 10.

Figure 6:
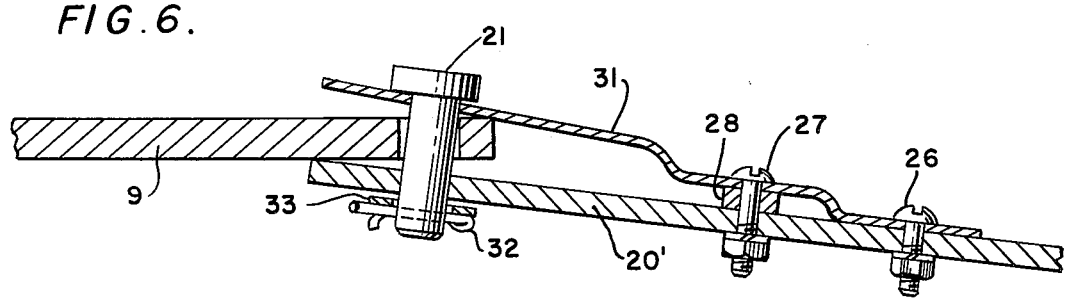
FIG. 6 illustrates the relation of the mower blade element to the mounting disc.
Figure 7:
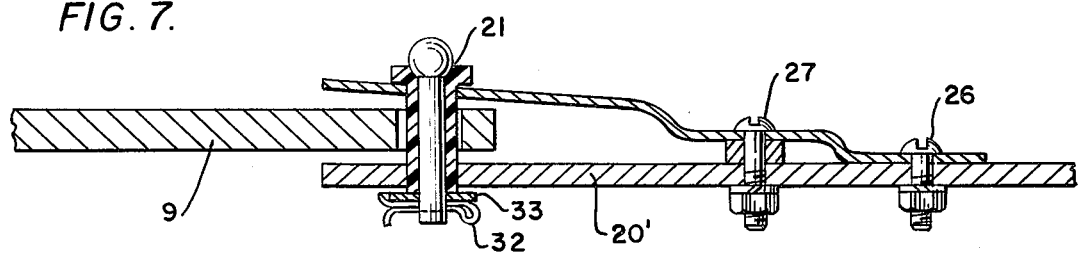
FIG. 7 is a view similar to FIG. 6 but wherein the blade element is radially disposed responsive to centrifugal force.

Another important feature of this invention is in the removable mounting of the blade elements 20 upon the disc 9. The blade elements may be of plastic or other synthetic material or the edges may be coated with a synthetic material. As is shown in FIGS. 4, 6 and 7, each blade element is pivotally retained on the disc through a headed steel pin 21. The radially outward end portion of the blade element comprises a leading cutting edge 22, and a trailing upward flange 23 whose function is to elevate the grass clippings and direct them upwardly into the housing. The radially inward portion 20' of the blade element is apertured at 24. An offset strap 25 of the blade element is bolted or otherwise fastened to the radially inward portion 20' at 26 and 27. A spacing washer 28 is inserted between the strap and the portion 20' at the offset. The offset arrangement provides additional strength. The strap is apertured at 29 to align with the aperture 24 in the radially inward portion 20'. When assembled the blade element and disc are associated as in FIGS. 6 and 7 and the retaining pin is inserted through the corresponding apertures. Upon being driven in rotation the centrifugal blade element assumes the position shown in FIG. 7 wherein an appreciable portion of the retaining pin is in normal contact with the aperture 13 of the disc. It has been found that with the parts as above described the retaining pin does not have a tendency to fall out, thereby providing an additional safety feature, should the cotter pin 32 and washer 33 accidentally fall off. It should be noted that the portion 31 of the strap 25 deviates from a plane parallel to the blade 20. This serves a very important function in that should the blade strike a rock or other resistant object, the strap, in pivoting about the pin 21 will progressively contact the periphery of the disc 9 thereby preventing the bolt 27 from being sheared. Further, when the plate 9 is rotated, centrifugal force causes the blade element to extend radially outwardly. As this is occurring, the aperture 29 of the strap portion 31 contacts the pin 21 to move it toward the axis 6 to a vertical position, while the aperture 24 of the portion 20' contacts the lower part of the pin to move it outwardly away from the axis 6. Thus it can be seen that this arrangement utilizes the strap as a stabilizing means to support the blade element as a radial extension of the disc. A substantially large area of the pin 21 is in contact with the apertures of the blade element and disc, thereby insuring longer wear without the danger of shearing the pin.

In use, the cutting blade unit or kit of FIG. 4 may be utilized with either the plate 16 or 18. The plate 18 may be disposed with the studs 19 facing downwardly as is shown in FIG. 9 or upwardly as in FIG. 10.

If it is desired to sharpen or replace the blade elements it would be merely necessary to remove the cotter pin 32 and pin 31. It would not be necessary to remove the disc 9.

The blade elements 20 may be mounted upon other means connected to the driven shaft and provide all of the advantages above noted.

What is claimed is:

1. In a lawn mower, a power driven shaft; a disc having a plurality of apertures; a plate having proturberances thereon for matching relation with some of said apertures; said disc and plate being matched and removably affixed to said shaft; a plurality of grass cutting blade elements pivotally mounted along the periphery of said disc and extending radially of said disc upon rotation thereof; each of said blade elements comprising a linear portion and a portion offset therefrom, said portions having apertures aligned along an axis perpendicular to said linear portion; said portions being disposed in straddling relation to the periphery of said disc with the linear portion below and the offset portion above the disc and with the apertures in said portions in alignment with another of said apertures in said disc; a pivot pin interconnecting the apertures in said portions and in the periphery of said disc; said linear portion and said offset portion closely surrounding said pivot pin in their respective apertures to support said pivot pin substantially perpendicular to said linear portion, said other aperture in said disc being sufficiently larger than the diameter of said pivot pin to allow said pivot pin and blade element to tilt with respect to said disc, said disc when rotated by said power driven shaft setting up a centrifugal force which yieldingly causes each blade element to be extended radially outwardly and substantially parallel to said disc with the pivot pin normal to said disc and to said linear portion of said blade element, and detachable means engagable with said pivot pin for positively retaining said pivot pin in said apertures of said linear and offset portions.

2. A device according to claim 1, wherein the protuberances in the plate are spaced substantially parallel flanges and the apertures in the disc are correspondingly spaced parallel slots.

3. A device according to claim 1, wherein the protuberances in the plate are substantially radially aligned studs and the opertures in the disc are correspondingly radially aligned.

4. A device according to claim 3, wherein the studded plate is disposed in intervening relation between the disc and the shaft to which it is affixed.

5. A device according to claim 3, wherein the disc is disposed in intervening relation between the plate and the shaft to which it is affixed.

6. A device according to claim 1, wherein the offset portion of said blade element gradually diverges toward the aperture thereof, whereby, upon deflection of the blade, the divergent portion will cammingly engage the disc.

7. A device according to claim 1, wherein each said cutting blade element is provided with a leading cutting edge and a trailing upwardly disposed clippings deflecting flange.

8. A device according to claim 1, wherein each said blade element is of plastic or other synthetic material.

9. A cutting unit for a rotary lawn mower which has at least one depending, vertical, driven shaft comprising a central substantially planar mounting plate having means for centrally attaching said plate to the driven shaft of the lawn mower and apertures provided along the periphery of the mounting plate, a plurality of grass cutting blade units pivotally mounted along the periphery of said mounting plate and extending radially outwardly of said plate upon rotation thereof, each of said blade units comprising a linear blade portion having inner and outer ends, and an offset strap portion secured to the linear portion intermediate the ends thereof and extending in overlying relation to the inner end of the linear blade portion, aligned apertures in the overlying offset strap portion and linear blade portion, said portions being disposed in straddling relation to the periphery of said mounting plate and in alignment with one of the apertures in said mounting plate, pivot pin means extending through the apertures in said offset and linear portions. perpendicular to said linear portion and through said one of the apertures in the periphery of said mounting plate for pivotally securing said blade unit to said mounting plate, and quick disconnect means for positively locking said pivot pin means in position extending through said apertures in said offset and linear portions and said one of the apertures in said mounting plate, said pivot pin means being loosely fitted in said one of the apertures in said mounting plate to permit said pivot pin means and said blade unit to tilt relative to said mounting plate whereby when said cutting unit is mounted on said shaft and is still, the blade unit slopes downardly from the periphery of the mounting plate under its own weight, and when said cutting unit is rotated by said shaft, centrifugal force acting on said blade unit will tilt the blade unit and pivot pin means until the blade portion of the blade unit is parallel to the mounting plate and extends radially outwardly therefrom.

10. A cutting unit according to claim 9 wherein the linear portion of each blade unit is provided with a leading cutting edge and a trailing upwardly disposed clippings deflecting flange.

* * * * *